(12) United States Patent
Oh et al.

(10) Patent No.: US 11,745,723 B2
(45) Date of Patent: Sep. 5, 2023

(54) VEHICLE DRIVING FORCE CONTROL METHOD

(71) Applicants: HYUNDAI MOTOR COMPANY, Seoul (KR); KIA MOTORS CORPORATION, Seoul (KR)

(72) Inventors: Ji Won Oh, Hwaseong-si (KR); Jeong Soo Eo, Hwaseong-si (KR); Sung Jae Kim, Suwon-si (KR); Lee Hyoung Cho, Suwon-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 202 days.

(21) Appl. No.: 17/218,696

(22) Filed: Mar. 31, 2021

(65) Prior Publication Data

US 2022/0111830 A1 Apr. 14, 2022

(30) Foreign Application Priority Data

Oct. 12, 2020 (KR) ........................ 10-2020-0130947

(51) Int. Cl.
*B60W 20/15* (2016.01)
*B60W 10/184* (2012.01)
*B60W 50/00* (2006.01)

(52) U.S. Cl.
CPC .......... *B60W 20/15* (2016.01); *B60W 10/184* (2013.01); *B60W 2050/001* (2013.01);
(Continued)

(58) Field of Classification Search
CPC .... B60W 10/04; B60W 10/184; B60W 20/15; B60W 30/188; B60W 40/10;
(Continued)

(56) References Cited

U.S. PATENT DOCUMENTS 5,010,490 A * 4/1991 Naito .................... B60W 10/06
701/65
5,631,829 A * 5/1997 Takasaki ............ B60K 23/0808
701/1
(Continued)

FOREIGN PATENT DOCUMENTS

CN 107107905 B * 8/2019 ............... B60K 6/48
CN 109866753 B * 4/2022 ............. B60K 6/383
(Continued)

OTHER PUBLICATIONS

Erban Andreas (WO2020193054A1.translate), Bosch GmbH Robert. Method for Operating a Drive System of an Electric Vehicle, Anddrive System for an Electric Vehicle. (Year: 2020).*

*Primary Examiner* — B M M Hannan
(74) *Attorney, Agent, or Firm* — MORGAN, LEWIS & BOCKIUS LLP (57) ABSTRACT

A vehicle driving force control method is provided. The vehicle driving force control method includes collecting vehicle driving information, estimating speed of a driving system of a vehicle from the collected vehicle driving information and calculating speed difference between measurement speed of the driving system and the estimated speed of the driving system, obtaining torque command rate information from the calculated speed difference, limiting a variation of reference torque command determined according to the vehicle driving information based on the acquired torque command rate information to determine final torque command, and controlling operation of a vehicle driving device according to the final torque command.

12 Claims, 9 Drawing Sheets

(52) U.S. Cl.
CPC ............... *B60W 2050/0012* (2013.01); *B60W 2510/0638* (2013.01); *B60W 2510/0657* (2013.01); *B60W 2510/081* (2013.01); *B60W 2510/083* (2013.01); *B60W 2710/18* (2013.01)

(58) Field of Classification Search
CPC ......... B60W 50/06; B60W 2050/0008; B60W 2050/001; B60W 2050/0012; B60W 2050/0019; B60W 2050/002; B60W 2050/0039; B60W 2510/0638; B60W 2510/0657; B60W 2510/081; B60W 2510/083; B60W 2540/10; B60W 2710/0666; B60W 2710/0672; B60W 2710/083; B60W 2710/085; B60W 2710/18
USPC ........................................................ 701/22
See application file for complete search history.

(56) References Cited

U.S. PATENT DOCUMENTS

| | | | | |
|---|---|---|---|---|
| 5,868,474 A * | 2/1999 | Abe | ................ | B60W 30/18145 180/197 |
| 6,547,697 B1 * | 4/2003 | Taffin | ................ | B60W 30/18 477/109 |
| 10,967,849 B2 * | 4/2021 | Jang | ................ | B60W 20/10 |
| 2003/0195691 A1 * | 10/2003 | Konishi | ................ | B60K 31/04 123/352 |
| 2003/0200021 A1 * | 10/2003 | Aoyama | ............ | F02D 41/2451 701/93 |
| 2004/0176899 A1 * | 9/2004 | Hallowell | ............ | B60W 30/02 701/84 |
| 2004/0195017 A1 * | 10/2004 | Braun | .................... | B60K 6/547 180/65.25 |
| 2004/0235613 A1 * | 11/2004 | Aoki | .................... | B60W 10/08 477/3 |
| 2004/0249518 A1 * | 12/2004 | Okoshi | ............ | B60W 30/1843 701/84 |
| 2009/0156355 A1 * | 6/2009 | Oh | .................... | B60W 30/186 903/946 |
| 2009/0261774 A1 * | 10/2009 | Yuuki | .................... | H02P 21/10 310/156.01 |
| 2010/0116235 A1 * | 5/2010 | Imamura | ................ | B60K 6/547 123/179.3 |
| 2012/0050675 A1 * | 3/2012 | Masaki | .................... | A61B 3/10 351/205 |
| 2012/0101675 A1 * | 4/2012 | Saito | ................ | B60W 30/1843 701/22 |
| 2012/0245773 A1 * | 9/2012 | Suzuki | .................... | B60L 15/20 701/22 |
| 2013/0035832 A1 * | 2/2013 | Nozu | .................... | B60K 17/35 701/69 |
| 2013/0193892 A1 * | 8/2013 | Ishihara | ................ | B60W 10/30 318/454 |
| 2013/0317687 A1 * | 11/2013 | Ito | ........................ | B60W 10/08 903/902 |
| 2014/0121873 A1 * | 5/2014 | Choi | .................... | B60W 10/08 903/902 |
| 2014/0129105 A1 * | 5/2014 | Shigeta | .............. | B60K 23/0808 701/69 |
| 2014/0277879 A1 * | 9/2014 | Sheidler | ................ | B60W 10/26 180/65.265 |
| 2015/0274033 A1 * | 10/2015 | Katsuyama | ............... | B60L 7/26 701/22 |
| 2015/0284005 A1 * | 10/2015 | Suzuki | .................... | B60T 8/175 701/22 |
| 2016/0137095 A1 * | 5/2016 | Oda | ........................ | B60L 58/40 701/22 |
| 2016/0137191 A1 * | 5/2016 | Bang | .................... | B60W 20/40 180/65.265 |
| 2016/0144739 A1 * | 5/2016 | Ando | ....................... | B60K 1/02 701/22 |
| 2016/0159362 A1 * | 6/2016 | Park | ....................... | F16H 63/46 701/54 |
| 2016/0264138 A1 * | 9/2016 | Jung | .................... | B60W 30/025 |
| 2017/0232958 A1 * | 8/2017 | Hata | .................... | B60W 30/18145 701/22 |
| 2018/0167006 A1 * | 6/2018 | Takeda | ............... | G03G 15/5008 |
| 2019/0291591 A1 * | 9/2019 | Suzuki | .................... | B60L 15/20 |
| 2019/0299967 A1 * | 10/2019 | Fujiwara | ................ | B60K 6/46 |
| 2019/0381989 A1 * | 12/2019 | Nozu | .................... | B60W 10/08 |
| 2020/0070836 A1 * | 3/2020 | Suzuki | .................... | B60L 15/20 |
| 2020/0130672 A1 * | 4/2020 | Oh | ........................ | B60W 10/06 |
| 2021/0031750 A1 * | 2/2021 | Oh | ........................ | B60K 28/16 |
| 2021/0129830 A1 * | 5/2021 | Matsubara | ............ | B60W 10/02 |

FOREIGN PATENT DOCUMENTS

| | | | | |
|---|---|---|---|---|
| DE | 3922262 | A1 * | 1/1990 | |
| JP | 2004011498 | A * | 1/2004 | |
| KR | 20140049638 | | 4/2014 | |
| KR | 101704243 | | 2/2017 | |
| WO | WO-2014045365 | A1 * | 3/2014 | ............. B60L 15/38 |
| WO | WO-2020193054 | A1 * | 10/2020 | |

\* cited by examiner

VEHICLE DRIVING FORCE CONTROL METHOD

CROSS-REFERENCE TO RELATED APPLICATION

This application claims the benefit of and priority to Korean Patent Application No. 10-2020-0130947 filed on Oct. 12, 2020, the entire contents of which are incorporated herein by reference.

TECHNICAL FIELD

The present disclosure relates to a vehicle driving force control method.

BACKGROUND

A driving system of a vehicle must generate corresponding driving force based on a driver's driving input value through an accelerator pedal or a brake pedal or an input value of torque command due to an advanced driver assistance system (ADAS). At this time, a change in the driving force may be needed. In the case in which the driving force is set so as to be excessively rapidly changed, a blowing problem due to twisting of a driving shaft or gear backlash or a driving feeling reduction problem caused by impact due to suddenly changed torque may occur.

In the case in which a variation of the driving force is excessively limited, on the other hand, excessive time may be taken until driving force required by the driver or the ADAS is generated. As a result, the behavior of the vehicle may be different from driver's intention. In addition, a slow reactivity problem may occur, and a dangerous situation in which it is not possible to cope with emergency of the vehicle may occur. A degree of reduction in noise, vibration, and harshness generated due to a sudden change in the driving force and a degree of securing vehicle acceleration and deceleration reactivity conflict with each other.

At present, a rate limit having various conditions as factors and a filter are used in the vehicle in order to generate the optimum torque command for a driving device (an engine or a driving motor) capable of solving such a conflict relationship. In addition, for an electrification vehicle using a motor as a driving source or a portion of the vehicle, a control unit capable of performing active feedback torque correction control to inhibit vibration that has already been generated using the motor is used. In order to develop such a control unit, however, excessive development man hour is required.

Furthermore, in recent years, driving force command has been generated using dualized or diversified methods depending on driving modes or situations in order to perform customized control based on driver's tendency. In this case, however, development man hour is abruptly increased depending on the number of diversified kinds.

The above information disclosed in this Background section is provided only for enhancement of understanding of the background of the disclosure and therefore it may contain information that does not form the prior art that is already known in this country to a person of ordinary skill in the art.

SUMMARY

The present disclosure provides a driving force control method capable of enabling a control unit of a vehicle to actively control a driving force command rate, whereby it is possible to reduce excessive development man hour necessary to develop the control unit configured to generate and control driving force and to set a driving force variation specialized depending on circumferences.

The present disclosure is not limited to those described above, and other unmentioned objects of the present disclosure will be clearly understood by a person of ordinary skill in the art (hereinafter referred to as an "ordinary skilled person") from the following description.

In one aspect, the present disclosure provides a vehicle driving force control method including: collecting, by a control unit, vehicle driving information; estimating, by the control unit, speed of a driving system of a vehicle from the collected vehicle driving information and calculating speed difference between measurement speed of the driving system and the estimated speed of the driving system among the vehicle driving information; acquiring, by the control unit, torque command rate information from the calculated speed difference; limiting, by the control unit, a variation of reference torque command determined according to the vehicle driving information based on the acquired torque command rate information to determine final torque command; and controlling, by the control unit, operation of a vehicle driving device according to the final torque command.

Other aspects and preferred embodiments of the disclosure are discussed infra.

DRAWINGS

The above and other features of the present disclosure will now be described in detail with reference to certain exemplary embodiments thereof illustrated in the accompanying drawings which are given hereinbelow by way of illustration only, and thus are not limitative of the present disclosure, and wherein.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes, will be determined in part by the particular intended application and use environment.

In the figures, reference numbers refer to the same or equivalent parts of the present disclosure throughout the several figures of the drawing.

DETAILED DESCRIPTION

Specific structural or functional descriptions of the embodiments of the present disclosure disclosed in this specification are given only for illustrating embodiments of the present disclosure. Embodiments of the present disclosure may be realized in various forms. In addition, the embodiments according to the concept of the present disclosure are not limited to such specific embodiments, and it should be understood that the present disclosure includes all alterations, equivalents, and substitutes that fall within the idea and technical scope of the present disclosure.

It will be understood that, although the terms "first", "second", etc. may be used herein to describe various elements, corresponding elements should not be understood as being limited by these terms, which are used only to distinguish one element from another. For example, within the scope defined by the present disclosure, a first element may be referred to as a second element, and similarly, a second element may be referred to as a first element.

It will be understood that, when a component is referred to as being "connected to" or "coupled to" another component, it may be directly connected to or coupled to the other component, or intervening components may be present. In contrast, when a component is referred to as being "directly connected to" or "directly coupled to" another component, there are no intervening components present. Other terms that describe the relationship between components, such as "between" and "directly between" or "adjacent to" and "directly adjacent to", must be interpreted in the same manner.

Wherever possible, the same reference numbers will be used throughout the drawings to refer to the same or like parts. The terms used in this specification are provided only to explain specific embodiments, but are not intended to restrict the present disclosure. A singular representation may include a plural representation unless it represents a definitely different meaning from the context. It will be further understood that the terms "comprises", "comprising" and the like, when used in this specification, specify the presence of stated components, steps, operations, and/or elements, but do not preclude the presence or addition of one or more other components, steps, operations, and/or elements.

Hereinafter, embodiments of the present disclosure will be described in detail with reference to the accompanying drawings.

The present disclosure relates to a vehicle driving force control method, and more particularly to a method of controlling a vehicle driving force variation (or a vehicle driving force rate). The control method according to the present disclosure is applicable to an electrification vehicle using a motor as a vehicle driving source. That is, the control method according to the present disclosure is applicable to a pure electric vehicle configured to drive using a motor, a fuel cell vehicle, or a hybrid vehicle configured to drive using both a motor and an engine (an internal combustion engine).

In the present disclosure, a difference value between speed (measurement speed) of a driving system of the vehicle and reference speed (estimation speed) of the driving system with factors, such as twisting and backlash, removed is calculated, and a driving force variation (or a driving force rate) is limited using a function of the difference value. Here, the driving system of the vehicle includes a motor or includes a motor and an engine, and the speed of the driving system, which is rotational speed of a device or a part of the driving system, may be motor speed or engine speed.

Various methods of calculating the driving system speed, the reference speed, and the difference value therebetween are known. In a general method, estimation speed (model speed) of the motor converted in consideration of a gear ratio from wheel speed is compared with actual speed (measurement speed) to obtain a difference value therebetween. That is, a speed difference value based on "actual speed of motor—wheel speed x effective gear ratio" is calculated so as to be used in correcting the driving force. The actual speed of the motor and the wheel speed are actual values detected by sensors.

However, the present disclosure proposes a method that does not use the wheel speed to determine the speed difference value, and the main object of the present disclosure is to provide a method of limiting a driving force variation (or a driving force rate) using the speed difference value, rather than a method of calculating the speed difference value.

A conventional driving force correction method (i.e. a method of limiting a driving force variation) and a driving force correction method according to the present disclosure are compared with each other as follows.

TABLE 1

| Conventional | Present disclosure |
| --- | --- |
| Torque rate (variation) is corrected based on map. | Torque rate is corrected in real time. |
| Torque command value is corrected. | Torque command rate is corrected. |
| Torque command is corrected after taking rate limit. | Rate limit value is corrected. |

In Table 1, torque corresponds to driving force, and torque rate means a driving force variation (a driving force rate).

Figure 1:
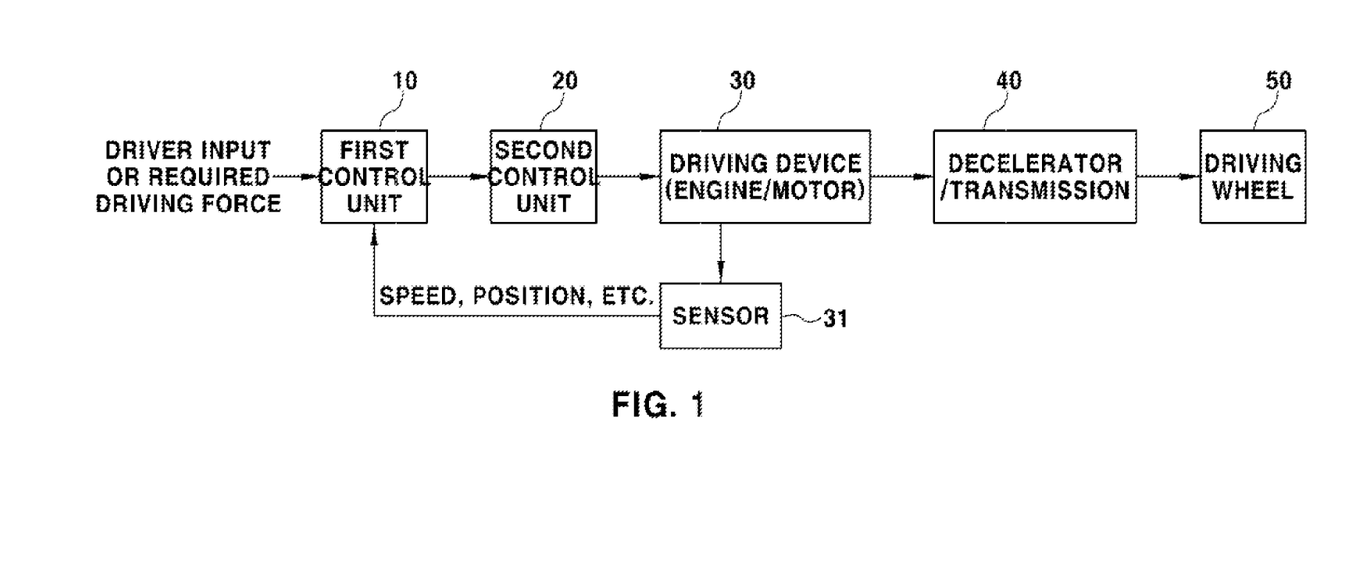
FIG. 1 is a block diagram showing the construction of an apparatus for performing a driving force control process in one form of the present disclosure.

FIG. 1 is a block diagram showing the construction of an apparatus for performing a driving force control process in some forms of the present disclosure. Referring to FIG. 1, the apparatus for performing the driving force control process includes a first control unit 10 configured to determine and generate torque command from vehicle driving information, a second control unit 20 configured to receive the torque command output from the first control unit 10 and to control operation of a driving device 30, and the driving device 30 being a vehicle driving source, operation of the driving device 30 being controlled by the second control unit 20.

The torque command is determined and generated based on vehicle driving information collected during driving of a general electrification vehicle. Here, the vehicle driving information may be sensor detection information detected by a sensor 31 and input over a vehicle network. The sensor may be a sensor configured to detect speed of the driving device. For example, the sensor may be a sensor configured to detect engine speed or a sensor configured to detect motor speed. The sensor configured to detect the motor speed may be a resolver configured to detect the position of a rotor of the motor.

Alternatively, the vehicle driving information may be information determined by the first control unit 10 or information (e.g. required driving force information) input to the control unit of the present disclosure from another control unit (e.g. an ADAS control unit) in the vehicle over the vehicle network. The first control unit 10 may be a vehicle control unit (VCU) or a hybrid control unit (HCU) configured to generate torque command based on the vehicle driving information in the general electrification vehicle.

In some forms of the present disclosure, the first control unit 10 determines reference torque command from the vehicle driving information, and corrects the determined reference torque command based on speed difference (a difference value between measurement speed and estimation speed), a description of which will follow, to generate final torque command. The final torque command is sent from the first control unit 10 to the second control unit, and the second control unit 20 controls operation of the driving device 30 based on the final torque command sent from the first control unit 10.

An accelerator position sensor (APS) value of a driver, a brake pedal position sensor (BPS) value of the driver, driving system speed detected by the sensor, and vehicle speed detected by the sensor may be selectively used as the vehicle driving information for determining and generating the torque command. In the vehicle driving information, the accelerator position sensor value and the brake pedal position sensor value are driver input information, and the driving system speed and the vehicle speed detected by the sensor are vehicle driving state information.

The method and process of determining and generating the torque command for controlling operation of the driving device in the electrification vehicle are known in the art to which the present disclosure pertains, and a detailed description thereof will be omitted.

The second control unit 20, which is a control unit configured to control operation of the driving device 30, which is a vehicle driving source, based on the torque command (corrected final torque command) generated by and output from the first control unit 10, may include a known motor control unit (MCU) configured to drive the motor, which is the driving device 30, and to control operation of the motor through an inverter based on the torque command in the general electrification vehicle. In addition, the second control unit 20 may further include a known motor control unit (MCU) configured to control operation of an engine, which is the driving device 30, based on the torque command in a hybrid vehicle.

In the following description, a control agent will be described as comprising a first control unit and a second control unit. However, the driving force control process in some forms of the present disclosure may be performed using a single integrated control element instead of a plurality of control units. The plurality of control units and the single integrated control element may be commonly referred to as a control unit, and the driving force control process, a description of which will follow, may be performed by the control unit. For example, the control unit may commonly refer to the first control unit and the second control unit.

Meanwhile, the vehicle driving force control process in some forms of the present disclosure includes a process of calculating a speed difference value and a process of correcting reference torque command using the calculated speed difference value to determine final driving force command. This process may be performed by the first control unit 30 configured to determine and generate torque command.

Specifically, in the vehicle driving force control process in some forms of the present disclosure, one of a method of determining a torque command rate corresponding to the calculated speed difference value, i.e. speed difference, and correcting torque command using the torque command rate (a first embodiment), a method of correcting a torque command rate using speed difference as feedback information and correcting torque command using the corrected torque command rate (a second embodiment), and a method of correcting reference torque command using speed difference as feedback information and applying rate limit to the corrected reference torque command to generate final torque command (a third embodiment) may be selectively applied.

First, a method of calculating a speed difference value (hereinafter referred to as "speed difference") will be described in detail.

Figure 2:
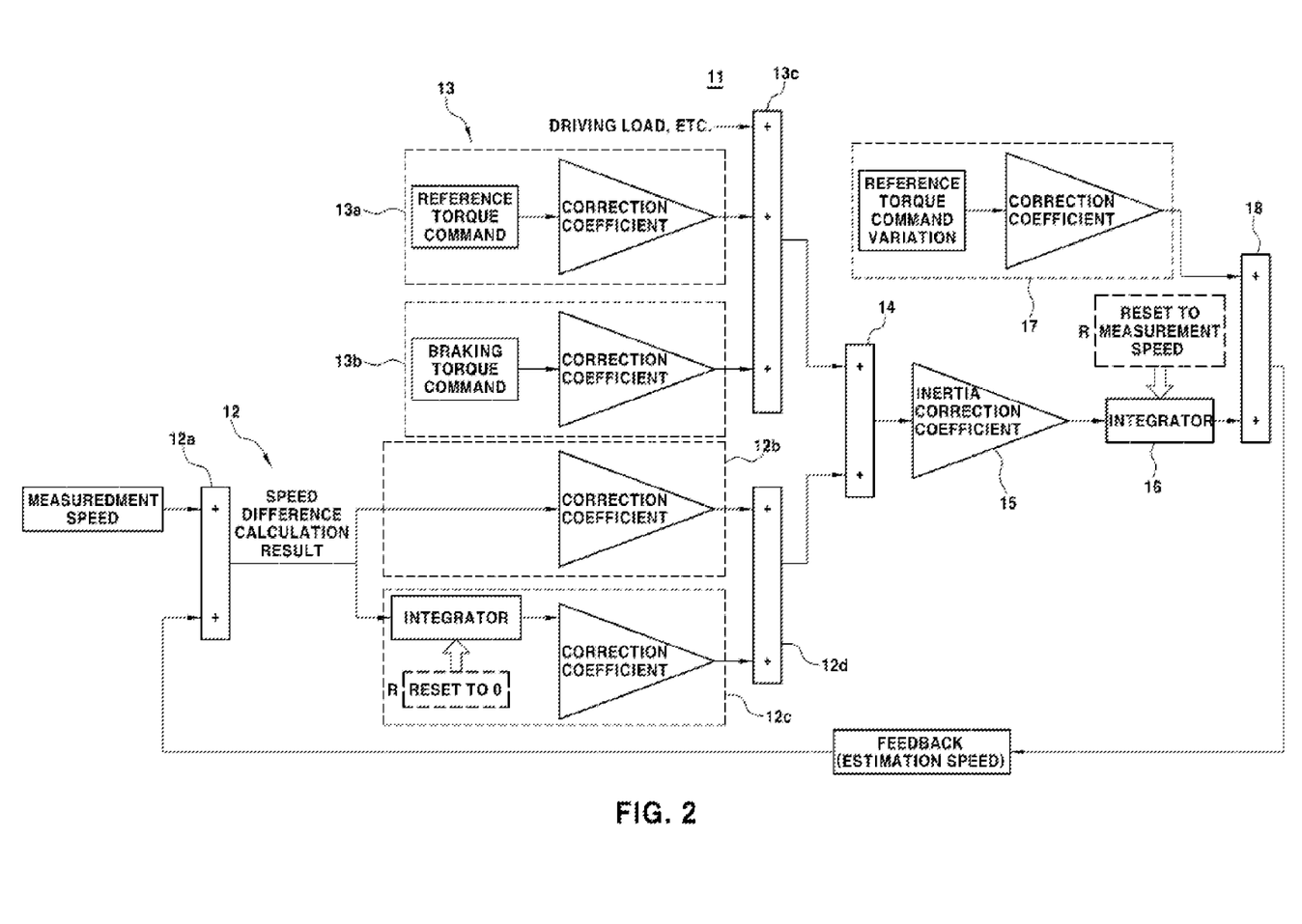
FIG. 2 is a block diagram showing the construction of a speed difference calculation unit in a first control unit configured to calculate speed difference in one form of the present disclosure and a speed difference calculation method.

FIG. 2 is a block diagram showing the construction of a speed difference calculation unit in a first control unit configured to calculate speed difference in some forms of the present disclosure and a speed difference calculation method. In some forms of the present disclosure, an observer-type speed difference calculation unit 11 may be used in order to determine speed difference, as shown.

In some forms of the present disclosure, speed difference to be obtained is determined as a difference value between measurement speed, which is the driving system speed measured by the sensor, and estimation speed, which is the driving system speed estimated using feedforward and feedback modes. Here, the driving system speed may be motor speed, and the estimation speed compared with the measured speed in order to calculate speed difference is the reference speed. The estimation speed is obtained from the driving system speed and the vehicle driving information and is used.

In some forms of the present disclosure, the step of the speed difference calculation unit 11 calculating speed difference includes a process of estimating the vehicle driving system speed from the collected vehicle driving information. In addition, the process of estimating the driving system speed includes a step of a feedback calculation unit 12 outputting a feedback control value using speed difference between the current measurement speed of the driving system and estimation speed in the previous control period as input, a step of a feedforward calculation unit 13 determining and outputting driving system torque from the vehicle driving information, a step of summing the output value of the feedback calculation unit 12 and the output value of the feedforward calculation unit 13 and converting the sum value into driving system angular acceleration using an inertia correction coefficient, and a step of determining estimation speed of the driving system from driving system angular speed obtained by integrating the converted driving system angular acceleration and rate information of reference torque command.

The construction of the apparatus will be described with reference to FIG. 2. Un some forms of the present disclosure, the speed difference calculation unit 11 includes a feedback calculation unit 12 and a feedforward calculation unit 13 in order to determine driving system speed (estimation speed). Here, the feedback calculation unit 12 may include an error calculation unit 12a, a P control unit 12b, an I control unit 12c, and a first summation unit 12d.

The error calculation unit 12a receives estimation speed observed in the previous control period as a feedback value. The error calculation unit 12a obtains speed difference between measurement speed and estimation speed in the previous control period. The speed difference, which is a speed error, becomes input of the P control unit 12b and the I control unit 12c. In addition, the speed difference calculated by the error calculation unit 12a becomes final speed difference to be obtained through the speed difference calculation unit 11 in the present disclosure.

The P control unit 12b outputs a value obtained by multiplying the speed difference (speed error) input from the error calculation unit 12a by a correction coefficient corresponding to P gain to the first summation unit 12d. Also, in the I control unit 12c, the speed difference input from the error calculation unit 12a is integrated by an error integrator 12c'. The I control unit 12c outputs a value obtained by multiplying the integrated value by a correction coefficient corresponding to I gain to the first summation unit 12d. The first summation unit 12d outputs a value obtained by summing the output value of the P control unit 12b and the output value of the I control unit 12c, and the sum value becomes an output value of the feedback calculation unit 12.

Speed difference may be calculated using an observer configuration shown in FIG. 2. In the case in which low pass filter (LPF)-processed speed difference between measurement speed and estimation speed is obtained, speed difference due to twisting or backlash of the driving system may be estimated, but lag exists due to characteristics of the LPF. This configuration may be a configuration without the feedforward calculation unit. At this time, only the feedback calculation unit is used. In the feedback calculation unit, one of the P control unit and the I control unit may be selectively used.

In order to correct filter lag, an observer configuration using a feedforward item as shown in FIG. 2 may be used. The feedforward calculation unit 13 includes an acceleration model unit 13a based on driving torque, a braking model unit 13b based on braking torque, and a second summation unit 13c.

The acceleration model unit 13a corrects torque command determined based on the accelerator position sensor (APS) value in the first control unit 10, i.e. reference torque command, and outputs a corrected driving torque (driving force) value to the second summation unit 13c. Here, the calculated driving torque value may be understood as a driving torque value at a wheel end of a vehicle driving wheel. The acceleration model unit 13a converts the reference torque command into a driving torque value at the wheel end or a value corresponding thereto. In the acceleration model unit, a correction coefficient may be a gear ratio between the motor and the driving wheel or a value proportional to the gear ratio.

The braking model unit 13b corrects torque command determined based on the brake pedal position sensor (BPS) value in the second control unit 20, i.e. braking torque command, and outputs a corrected braking torque (braking force) value to the second summation unit 13c. In the braking model unit 13b, a correction coefficient may be a coefficient between braking hydraulic pressure and braking force or a value proportional to the gear ratio.

In addition, the feedforward calculation unit 13 may further include an additional model unit configured to determine a torque value using a road surface slope or air resistance as input and to output the determined torque (driving load) value to the second summation unit 13c, and may further include an additional model unit configured to calculate a torque value using an input variable related to driving resistance of the vehicle in addition to the road surface slope or the air resistance and to output the calculated torque value to the second summation unit 13c. In the feedforward calculation unit 13, as described above, the vehicle torque value based on the vehicle driving information is obtained and output in a feedforward mode.

The speed difference calculation unit 11 may further include an observation value summation unit 14, a correction unit 15, an angular acceleration integrator 16, a shaft compliance model unit 17, and a final summation unit 18 in addition to the feedback calculation unit 12 and the feedforward calculation unit 13. In the speed difference calculation unit 11, as described above, the output value of the feedback calculation unit 12 and the output value of the feedforward calculation unit 13 are input to the observation value summation unit 14 so as to be summed. The value summed by and output from the observation value summation unit 14 becomes a torque-dimensional value.

The correction unit 15 converts the value summed by and output from the observation value summation unit 14, as described above, into an angular acceleration using an inertia correction coefficient. The inertia correction coefficient, which is related to vehicle equivalent inertia, is set in advance as a value inversely proportional to the vehicle equivalent inertia (total equivalent weight). Here, the reason that the term "equivalent" is used is that, in the total weight (mass) of the vehicle related to acceleration and deceleration of the vehicle, values corresponding to a linear movement element and rotary elements having different gear ratios must be included or summed.

In the speed difference calculation unit 11, the value output from the observation value summation unit 14 is divided by equivalent inertia in the correction unit 15 so as to be obtained as an angular acceleration value, and angular acceleration is input to the angular acceleration integrator 16 so as to be integrated. As a result, an angular speed value is output from the angular acceleration integrator 16, and the angular speed value is input to the final summation unit 18.

A value output from a model unit related to a spring compliance of a driving shaft, i.e. the shaft compliance model unit 17, is input to the final summation unit 18 so as to be summed with the angular speed value output from the angular acceleration integrator 16. In the final summation unit 18, as described above, the angular speed value output from the angular acceleration integrator 16 and the value output from the shaft compliance model unit 17 are summed to obtain a final estimation speed value.

In the shaft compliance model unit 17, a reference torque command variation is used as input, and a value obtained by correcting the reference torque command variation by a correction coefficient is output. Here, the correction coefficient, which is related to an effective spring constant (k in F=kx), is set in advance as a value corresponding to the effective spring constant.

In the angular acceleration integrator 16, reset R may be added as needed. The reset is used when shifting intervention, driving wheel conversion, and stationary state correction are needed. At the time of reset, speed in the integrator 16 is reset to measurement speed. At this time, the error integrator 12c' of the I control unit 12c is set to 0.

Meanwhile, a first embodiment of correcting torque command, in some forms of the present disclosure, will be described in detail. In the first embodiment, a torque command rate corresponding thereto is determined from the speed difference calculated as described above, and torque command is corrected using the determined torque command rate.

Figure 3A:
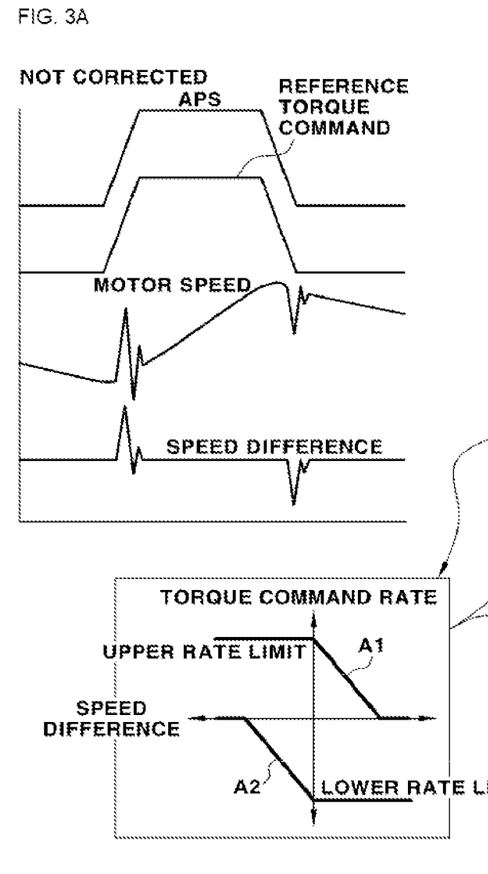
FIG. 3A and FIG. 3B are views illustrating, for comparison, the state in which torque command is corrected and the state in which torque command is not corrected in the driving force control process in one form of the present disclosure.
Figure 3B:
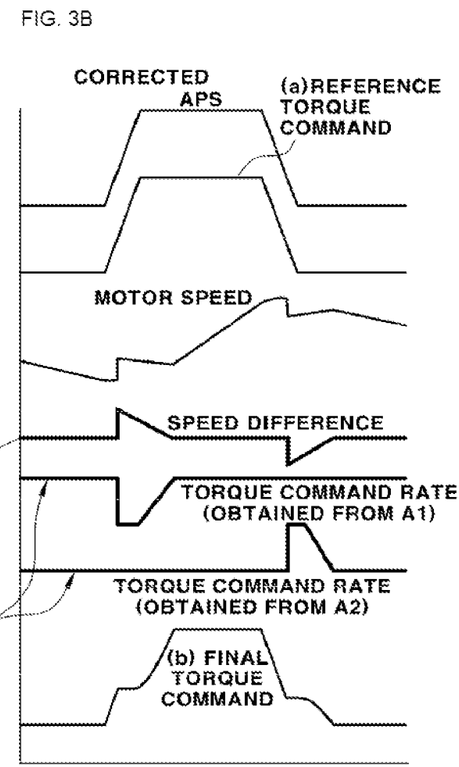

FIG. 3A and FIG. 3B are views illustrating, for comparison, the state in which torque command is corrected and the state in which torque command is not corrected in the driving force control process in some forms of the present disclosure. The first control unit 10 may further include a feedforward type control unit (not shown) configured to determine a torque command rate using the speed difference calculated by the speed difference calculation unit 11 as described above as input.

The first control unit 10 corrects reference torque command based on the calculated torque command rate and determines final torque command. That is, the reference torque command is corrected based on the torque command rate determined from the speed difference, and the corrected torque command become final torque command. At the time of correction, a reference torque command variation is limited according to the calculated torque command rate.

Also, in determining the torque command rate corresponding to the speed difference calculated by the speed difference calculation unit 11, as described above, the torque command rate may be determined from the calculated speed difference based on pre-stored setting information, such as a map that defines the interrelation between speed difference and torque command rate or a functional equation having speed difference as an independent variable.

Figure 4:
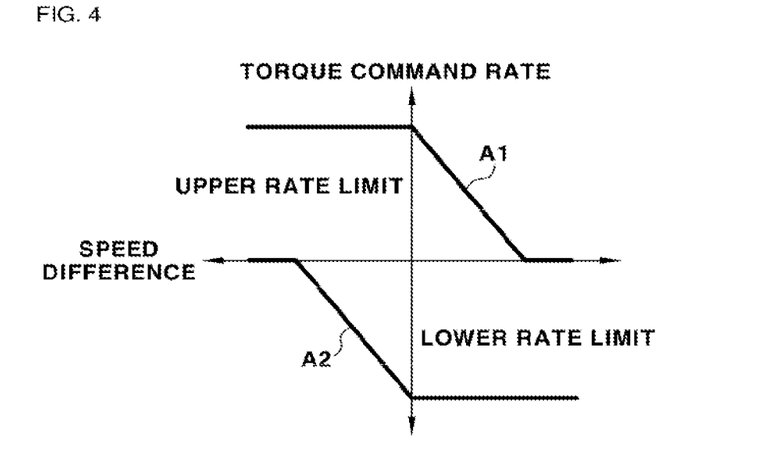
FIG. 4 is a view illustrating a diagram for determining a torque command rate from speed difference in the driving force control process in one form of the present disclosure.

FIG. 4 is a view illustrating a diagram for determining a torque command rate from speed difference in the driving force control process in some forms of the present disclosure. In some forms of the present disclosure, the torque command rate based on the speed difference is used to correct reference torque command to thus generate final torque command. The torque command after correction obtained by applying the torque command rate becomes final torque command.

That the torque command rate based on the speed difference is applied to the reference torque command, as described above, means that a variation of the reference torque command is limited to a torque command rate corresponding to current speed difference. For example, although a variation of the reference torque command actually becomes a larger value by applying a torque command rate corresponding to current speed difference to the reference torque command, the variation of the reference torque command is limited to a value based on the torque command rate, whereby the variation of the reference torque command becomes a value less than the actual value before correction.

Figure 5:
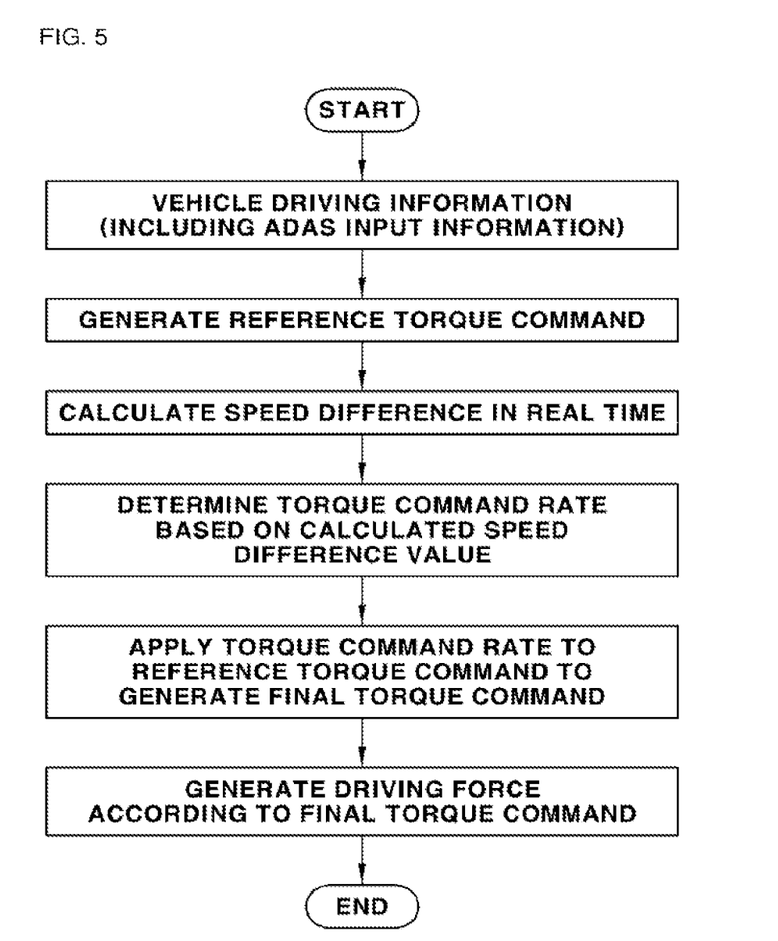
FIG. 5 is a flowchart showing a driving force control process in one form of the present disclosure.

In FIG. 5, as described above, the torque command rate is used to limit the variation of the reference torque command, and torque command having a variation of the reference torque command obtained as a value limited according to the torque command rate becomes final torque command.

In general, the larger the speed difference, the larger the backlash or twisting of the driving system. Consequently, the map or the functional equation may be set to perform correction such that the larger the speed difference, the more the torque command rate is limited. For example, as shown in FIG. 4, the map, the diagram, and the functional equation may be set such that the larger the absolute value of the speed difference, the more the torque command rate is limited. In contrast, the map, the diagram, and the functional equation may be set such that the smaller the absolute value of the speed difference, the less the torque command rate is limited.

Here, that the torque command rate is more limited means that, in the torque command rate diagram of FIG. 4, the absolute value of the torque command rate becomes a smaller value than before more limitation. In contrast, that the torque command rate is less limited means that the torque command rate becomes a larger value than before more limitation.

In addition, it is necessary to determine torque command in consideration of backlash. For example, increase in torque command must be limited in order to reduce backlash in a positive (+) direction, and decrease in torque command must be limited in order to reduce backlash in a negative (−) direction. To this end, a rate limit value calculation process may be dualized depending on the direction of a speed difference value. Here, the direction of the speed difference value indicates whether a value obtained by subtracting estimation speed from measurement speed is a positive (+) value or a negative (−) value. The direction of the speed difference value is classified as a positive direction or a negative direction depending on whether the speed difference is a positive value or a negative value.

In FIG. 4, torque command rate A1 becomes a limit value that limits increase in torque command, and torque command rate A2 becomes a limit value that limits decrease in torque command. At this time, depending on the direction of the speed difference, torque command rate A1 is applied to limit increase in torque command when the value of the speed difference is a positive-direction value, and torque command rate A2 is applied to limit decrease in torque command when the value of the speed difference is a negative-direction value (see the reference torque command and the final torque command of FIG. 3A and FIG. 3B).

FIG. 5 is a flowchart showing a driving force control process in some forms of the present disclosure. The first embodiment is an embodiment to which a method of determining a torque command rate corresponding to speed difference and correcting torque command (driving force command) using the torque command rate, as described with reference to FIGS. 3 and 4, is applied.

The first embodiment will be described with reference to FIG. 5. The control unit (the first control unit) acquires vehicle driving information including driver input information, vehicle driving state information, and ADAS input information, and generates reference torque command based on the vehicle driving information. Subsequently, the control unit calculates speed difference between measurement speed and estimation speed in real time, and determines a torque command rate based on the calculated speed difference.

The torque command rate is used to limit a variation of the reference torque command. The reference torque command is corrected based on the determined torque command rate to generate final torque command. As a result, the control unit (the first control unit and the second control unit) controls operation of the driving device based on the final torque command, whereby it is possible to generate target vehicle driving force.

Next, a second embodiment of correcting torque command will be described in detail as another embodiment of the present disclosure. In the second embodiment, a torque command rate is corrected using the speed difference calculated by the speed difference calculation unit 11 as feedback information, and torque command is corrected using the corrected torque command rate.

More specifically, in the second embodiment, the torque command rate is determined using a function of the speed difference calculated by the speed difference calculation unit 11, in the same manner as in the first embodiment. However, the difference between the first embodiment and the second embodiment is that, in the first embodiment, the torque command rate is determined and applied based on the speed difference value, whereas, in the second embodiment, the torque command rate is controlled such that the current speed difference value converges upon a desired speed difference value.

In brief, the processes of "generation of reference torque command->generation of torque->generation of speed difference->sensing and calculation of speed difference->feedforward correction of torque command rate (torque command rate is determined based on speed difference value) are performed in the first embodiment. In the case in which the first embodiment is applied, the speed difference may be reduced but a correction amount may be insufficient. In contrast, the processes "generation of reference torque command->generation of torque->generation of speed difference->sensing and calculation of speed difference->correction of torque command rate->feedback of speed difference error (speed difference is reduced but correction amount is insufficient)->further correction of torque command rate" are performed in the second embodiment.

To this end, in the second embodiment, target speed difference may be further used, and the target speed difference may be a fixed value preset in the control unit. For example, the target speed difference may be set to 0, and the speed difference calculated by the speed difference calculation unit 11 may converge upon a target speed difference of 0.

Alternatively, target speed difference meaning an appropriate tolerance value may be determined based on the reference torque command. In this case, a map, a diagram, or a functional equation capable of determining target speed difference using the reference torque command as an input variable may be stored in advance in the control unit so as to be used. For example, the control unit may determine the target speed difference from the reference torque command using the following shaft compliance equation $$\Delta\omega_{tar} = k_{inv} T_{cmd} \qquad \text{[Equation 1]}$$

Where $\Delta\omega_{tar}$ indicates target speed difference, $k_{inv}$ indicates a reciprocal of a shaft spring constant, and $T_{cmd}$ indicates reference torque command.

After the speed difference is calculated by the speed difference calculation unit 11, the torque command rate is determined based on the calculated speed difference, and the target speed difference is determined, as described above, the torque command rate is feedback corrected such that speed difference in the previous control period follows the target speed difference. That is, the speed difference in the previous control period is compared with the target speed difference, and the torque command rate is adjusted such that a speed difference error value, which is a difference value, becomes 0. The reference torque command is corrected using the adjusted torque command rate to calculate final torque command. Here, in the case in which target speed difference determined by Equation 1, rather than a set value (a fixed value), is used, the target speed difference may be a value determined in the current control period.

Also, in the second embodiment, PID control using the speed difference calculated by the speed difference calculation unit 11 or an error thereof (a difference value between the calculated speed difference and the target speed difference) as control feedback information may be used.

Figure 6:
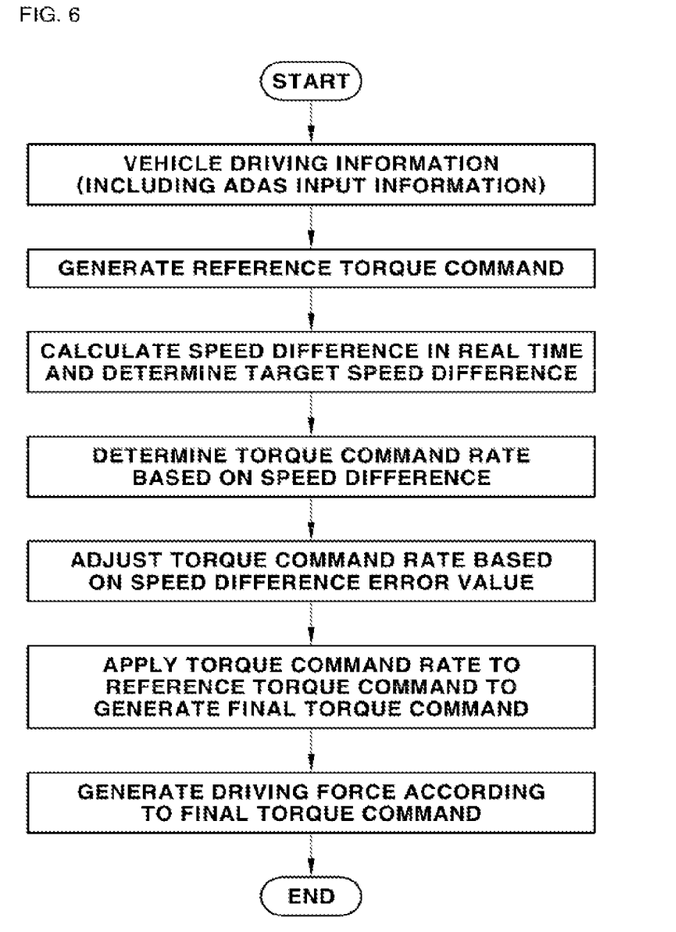
FIG. 6 is a flowchart showing a driving force control process in one form of the present disclosure.

FIG. 6 is a flowchart showing a driving force control process in some forms of the present disclosure. The second embodiment is an embodiment to which a method of determining a torque command rate using the speed difference as feedback information and correcting reference torque command using the corrected torque command rate, as described above, is applied.

The second embodiment will be described with reference to FIG. 6. The control unit (the first control unit) acquires vehicle driving information including driver input information, vehicle driving state information, and ADAS input information, and generates reference torque command based on the vehicle driving information. Subsequently, the control unit calculates speed difference between measurement speed and estimation speed in real time, and determines a torque command rate based on the calculated speed difference. Subsequently, the control unit determines target speed difference (which may be a set value), and compares speed difference in the previous control period with the target speed difference to adjust (correct) the torque command rate based on a speed difference error value. As a result, the control unit may correct the reference torque command based on the adjusted torque command rate to generate final torque command, and the control unit (the first control unit and the second control unit) may control operation of the driving device based on the final torque command, whereby it is possible to generate target vehicle driving force.

Next, a third embodiment of correcting torque command will be described in detail as another embodiment of the present disclosure. In the third embodiment, reference torque command is corrected using speed difference as feedback information, and rate limit is applied to the torque command after correction to generate final torque command.

More specifically, in the third embodiment, a torque command rate is not directly determined based on speed difference. A correction amount is determined based on a speed difference value, reference torque command is corrected based on the determined correction amount, and correction is performed in a manner in which rate limit is further applied to the corrected reference torque command to generate final torque command. Here, a manner in which rate limit is applied to a correction amount added to or subtracted from the reference torque command may also be used.

Figure 7:
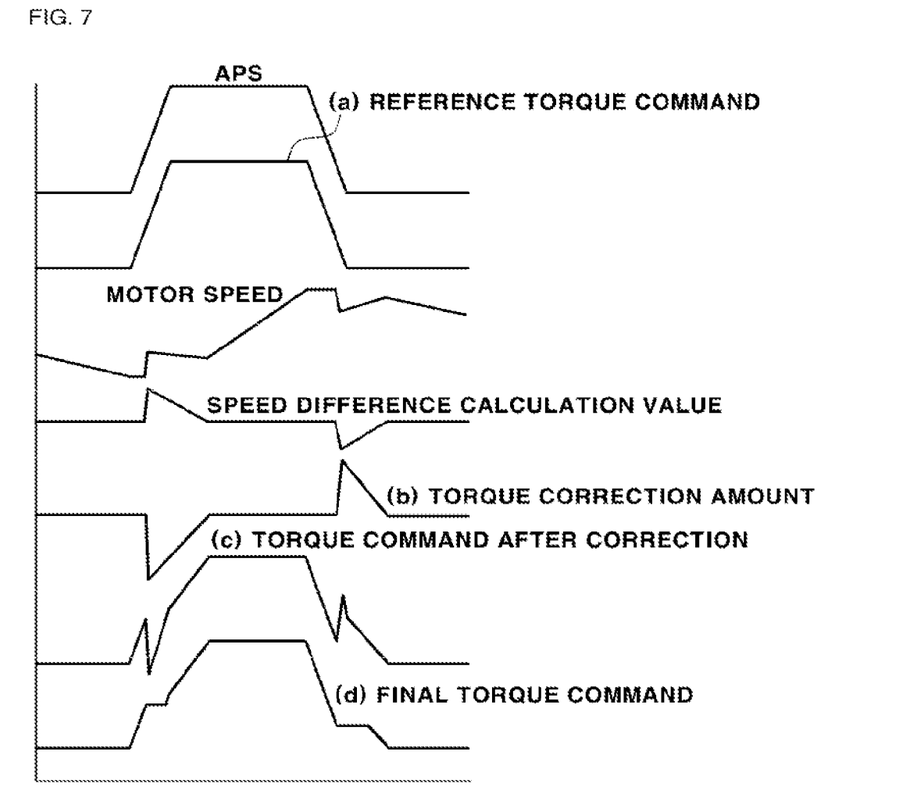
FIG. 7 is a view illustrating the state in which correction of torque command in one form of the present disclosure is performed.

FIG. 7 is a view illustrating the state in which correction of torque command in some forms of the present disclosure is performed. A correction method according to the third embodiment will be described with reference to FIG. 7. First, reference torque command a is determined based on an accelerator position sensor (APS) value, and a correction amount b corresponding to the speed difference value calculated by the speed difference calculation unit 11 is determined. Subsequently, correction to add or subtract the correction amount b to or from the reference torque command a is performed to generate torque command c after correction. Here, the correction amount may be determined using a control unit using speed difference as input. The correction amount may be determined through PID control having speed difference as input. Subsequently, correction is performed in a manner in which rate limit is applied the torque command c after correction to generate final torque command d.

In the above description, rate limit is applied to the torque command c after correction to generate final torque command d. Alternatively, rate limit may be first applied to the correction amount, and the final torque command may be generated in a manner in which the correction amount to which the rate limit is applied is added to or subtracted from the reference torque command.

In the third embodiment, a rate limit range must be set in order to apply the rate limit. In the control unit, the rate limit range may be set based on a rate of the reference torque command. At this time, the rate limit range is defined as the upper rate limit value and the lower rate limit value. A rate limit value may be determined as 0 and a multiple of the reference torque command rate. In addition, the rate limit range may be set to a range between 0 and a multiple of the reference torque command rate. Alternatively, the rate may not be limited only by the multiple of the reference torque command rate but may be limited by a constant. In addition, a larger one of the multiple of the reference torque command rate and the constant may be taken as the rate limit value such that, even when there is no change in the reference torque command, the torque command after correction converges on the reference torque command.

Figure 8:
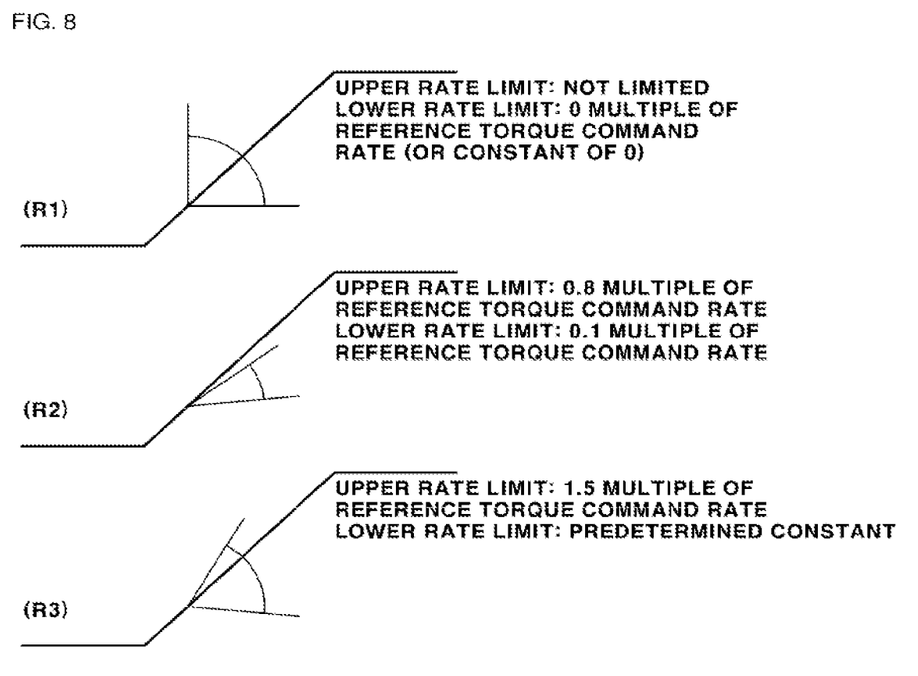
FIG. 8 is a view showing rate limit setting examples in one form of the present disclosure.

FIG. 8 is a view showing rate limit setting examples in some forms of the present disclosure. (R1), (R2), and (R3) are shown as rate limit setting examples set based on reference torque command. (R1) is an example in which the upper limit of the rate limit range is not limited and 0 multiple of the reference torque command rate, i.e. a value of 0, is set to the lower limit value. (R2) is an example in which both the upper limit value and the lower limit value are set to a multiple of the reference torque command rate, and (R3) is an example in which the upper limit value is set to a multiple of the reference torque command rate and the lower limit value is set to a predetermined constant.

In the third embodiment, as described above, when the torque command rate limit range is set, the torque command rate limit range may be applied to the torque command c after correction. As a result, final torque command having a rate limit value with respect to the torque command c after correction may be determined. Also, in the third embodiment, the torque command rate limit range may be dualized depending on whether the reference torque command is a positive (+) value or a negative (−) value. In addition, the rate limit value calculation process may be dualized depending on the direction of the calculated speed difference value, in the same manner as in the first embodiment.

Figure 9:
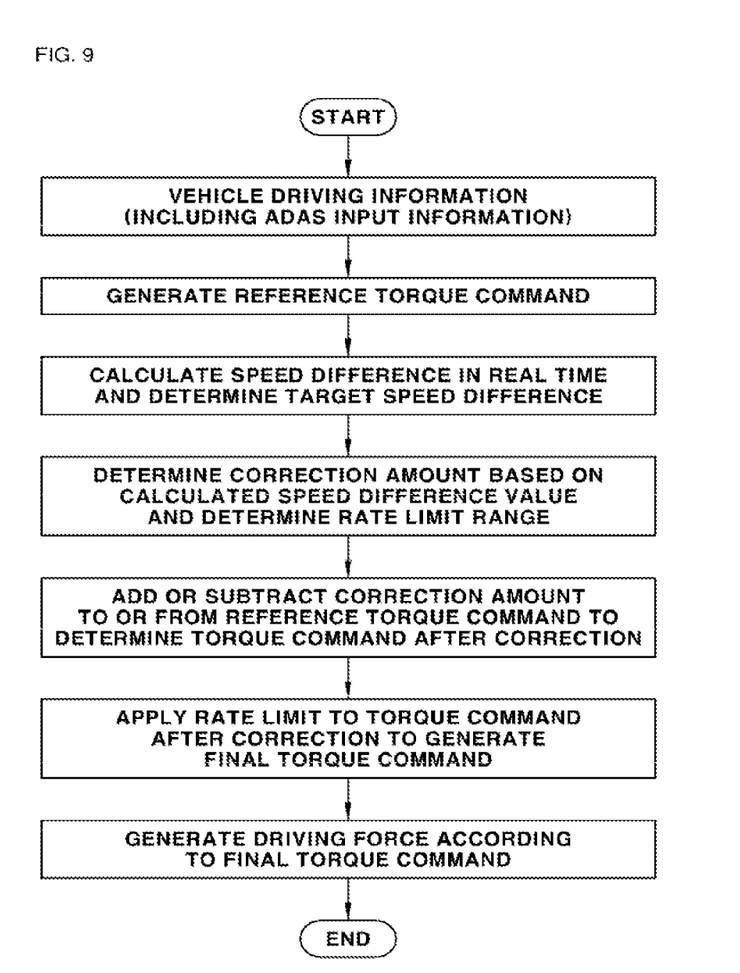
FIG. 9 is a flowchart showing a driving force control process in one form of the present disclosure.

FIG. 9 is a flowchart showing a driving force control process in some forms of the present disclosure. The third embodiment is an embodiment to which a method of determining a correction amount using the speed difference calculated by the speed difference calculation unit as feedback information and correcting torque command using the determined correction amount is applied.

The third embodiment will be described with reference to FIG. 9. The control unit (the first control unit) acquires vehicle driving information including driver input information, vehicle driving state information, and ADAS input information, and generates reference torque command based on the vehicle driving information. Subsequently, the control unit calculates speed difference between measurement speed and estimation speed in real time. In addition, the control unit determines a torque correction amount based on the calculated speed difference and determines a rate limit range. Subsequently, the control unit adds or subtracts the torque correction amount to or from the reference torque command to determine torque command after correction, and applies rate limit to the determined torque command after correction to determine final torque command. As a result, the control unit (the first control unit and the second control unit) controls operation of the driving device based on the final torque command, whereby it is possible to generate target vehicle driving force.

In some forms of the present disclosure, as described above, the control unit of the vehicle may control the driving force command (torque command) rate. In some forms of the present disclosure, therefore, it is possible to reduce excessive development man hour necessary to develop the control unit configured to generate and control driving force and to set a driving force variation specialized depending on circumferences.

As is apparent from the foregoing, in a vehicle driving force control method in some forms of the present disclosure, a control unit of a vehicle is capable of controlling a driving force command (torque command) rate using speed difference between actual speed and estimation speed of a driving system. As a result, it is possible to reduce excessive development man hour necessary to develop the control unit configured to generate and control driving force and to set a driving force variation specialized depending on circumferences.

The effects of the present disclosure are not limited to those mentioned above, and other unmentioned effects will be clearly understood by an ordinary skilled person from the above description.

It will be apparent to a person of ordinary skill in the art that the present disclosure described above is not limited to the above embodiments and the accompanying drawings and that various substitutions, modifications, and variations can be made without departing from the technical idea of the present disclosure.

What is claimed is:

1. A vehicle driving force control method comprising:
collecting, by a controller, vehicle driving information;
estimating, by the controller, speed of a driving system of a vehicle from the vehicle driving information and calculating speed difference between measurement speed of the driving system and the estimated speed of the driving system;
obtaining, by the controller, torque command rate information from the calculated speed difference;
limiting, by the controller, a variation limit value of reference torque command that is determined based on the vehicle driving information;
determining, by the controller, a final torque command based on the torque command rate information; and
controlling, by the controller, operation of a vehicle driving device according to the final torque command.

2. The vehicle driving force control method according to claim 1, wherein the method comprises:
measuring, by a sensor, a motor speed or an engine speed; and
estimating the speed of the driving system based on the motor speed or the engine speed, wherein the vehicle driving device is a motor or an engine.

3. The vehicle driving force control method according to claim 1, wherein the method comprises:
when obtaining the torque command rate information, determining, by the controller, a torque command rate corresponding to the calculated speed difference using pre-stored setting information; and
when determining the final torque command, limiting, by the controller, the variation of the reference torque command based on the determined torque command rate to determine the final torque command.

4. The vehicle driving force control method according to claim 3, wherein the method further comprises:
calculating the speed difference by subtracting the estimation speed from the measured speed of the driving system;
decreasing the reference torque command by the determined torque command rate when the speed difference is a positive value; and
increasing the reference torque command by the determined torque command rate when the speed difference is a negative value.

5. The vehicle driving force control method according to claim 3, wherein the method further comprises:

setting the pre-stored setting information to inversely correlate an absolute value of the speed difference to an absolute value of the torque command rate.

6. The vehicle driving force control method according to claim 1, wherein
when obtaining the torque command rate information, determining, by the controller, a torque command rate corresponding to the calculated speed difference using pre-stored setting information and correcting the determined torque command rate using speed difference calculated in a previous control period as feedback information; and
when determining the final torque command, limiting, by the controller, the variation of the reference torque command according to the corrected torque command rate to determine the final torque command.

7. The vehicle driving force control method according to claim 6, wherein calculating the speed difference comprises:
determining, by the controller, the speed difference based on the reference torque command, or predetermining a value of the speed difference.

8. The vehicle driving force control method according to claim 1, wherein estimating the speed of the driving system comprises:
outputting, by a feedback calculation unit of the controller, a feedback control value using speed difference between current measurement speed of the driving system and estimated speed in a previous control period as input;
determining and outputting, by a feedforward calculation unit of the controller, driving system torque from the vehicle driving information;
summing an output value of the feedback calculation unit and an output value of the feedforward calculation unit and converting a sum value into driving system angular acceleration using an inertia correction coefficient; and
obtaining estimated speed of the driving system from driving system angular speed obtained by integrating the converted driving system angular acceleration and rate information of reference torque command.

9. The vehicle driving force control method according to claim 8, wherein outputting the feedback control value comprises:
summing, by a first summation unit, an output value of a proportional (P) control unit and an output value of the integral (I) control unit; and
outputting a sum value as the feedback control value, wherein each of the P control unit and the I control unit uses the speed difference between the current measurement speed and the estimated speed in the previous control period as input.

10. The vehicle driving force control method according to claim 8, wherein the method further comprises:
applying, by an acceleration model unit, a correction coefficient to the reference torque command, which is driving torque command, to determine and output a driving torque value;
applying, by a braking model unit, a correction coefficient to braking torque command to determine and output a braking torque value; and
summing, by a second summation unit, an output value of the acceleration model unit and an output value of the braking model unit and outputting a sum value as the driving system torque.

11. The vehicle driving force control method according to claim 8, wherein obtaining the estimation speed of the driving system comprises:
correcting a variation of the reference torque command by a correction coefficient; and summing the variation of the reference torque command with the driving system angular speed to obtain the estimation speed of the driving system.

12. A vehicle driving force control method comprising:
collecting, by a controller, vehicle driving information;
estimating, by the controller, speed of a driving system of a vehicle from the vehicle driving information and calculating speed difference between measurement speed of the driving system and the estimated speed of the driving system;
obtaining, by the controller, torque command rate information from the calculated speed difference;
limiting, by the controller, a variation of reference torque command that is determined based on the vehicle driving information;
determining, by the controller, a final torque command based on the torque command rate information; and
controlling, by the controller, operation of a vehicle driving device according to the final torque command,
wherein the method further comprises:
calculating the speed difference by subtracting the estimation speed from the measured speed of the driving system;
decreasing the reference torque command by the determined torque command rate when the speed difference is a positive value; and
increasing the reference torque command by the determined torque command rate when the speed difference is a negative value.

* * * * *